United States Patent
Kim et al.

(10) Patent No.: US 9,535,556 B2
(45) Date of Patent: Jan. 3, 2017

(54) TOUCH DISPLAY APPARATUS

(71) Applicant: LG Display Co., Ltd., Seoul (KR)

(72) Inventors: Ju Han Kim, Bucheon-si (KR); Yong Chan Park, Seoul (KR); Jin Seong Kim, Goyang-si (KR); Seung Kyeom Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/983,546

(22) Filed: Dec. 30, 2015

(65) Prior Publication Data

US 2016/0224155 A1 Aug. 4, 2016

(30) Foreign Application Priority Data

Jan. 30, 2015 (KR) .................. 10-2015-0015517
Oct. 14, 2015 (KR) .................. 10-2015-0143597

(51) Int. Cl.
*G06F 3/044* (2006.01)
*G06F 3/041* (2006.01)

(52) U.S. Cl.
CPC ............. *G06F 3/044* (2013.01); *G06F 3/0412* (2013.01)

(58) Field of Classification Search
CPC ...... G06F 3/044; G06F 3/0412; G06F 3/0416; G06F 3/041; G02F 1/13338
USPC .................................. 345/173, 174
See application file for complete search history.

(56) References Cited

U.S. PATENT DOCUMENTS

| | | | |
|---|---|---|---|
| 2010/0194697 A1* | 8/2010 | Hotelling | G06F 3/0412 345/173 |
| 2012/0086654 A1* | 4/2012 | Song | G06F 3/0412 345/173 |
| 2012/0218199 A1* | 8/2012 | Kim | G06F 3/0412 345/173 |
| 2013/0033439 A1* | 2/2013 | Kim | G02F 1/13338 345/173 |
| 2013/0162570 A1 | 6/2013 | Shin et al. | |

(Continued)

FOREIGN PATENT DOCUMENTS

CN 103176302 A 6/2013
CN 13364983 A 10/2013

(Continued)

OTHER PUBLICATIONS

Office Action for Taiwanese Patent Application No. TW 10521147550, Sep. 14, 2016, 18 Pages.

*Primary Examiner* — Koosha Sharifi-Tafreshi

(74) *Attorney, Agent, or Firm* — Fenwick & West LLP

(57) ABSTRACT

Disclosed is a touch sensitive display apparatus which decreases a load of each of a plurality of touch electrodes and reduces a load deviation between the plurality of touch electrodes, thereby enhancing image quality. The touch sensitive display apparatus comprises a touch sensitive panel. The touch panel comprises a plurality of touch electrodes comprising at least a first touch electrode. The first touch electrode comprises a plurality of first touch electrode lines that are parallel to each other. A first touch signal line is connected to the plurality of first touch electrode lines of the first touch electrode, and the first touch electrode is driven for image display and touch sensing via the first touch signal line. A first connecting line is in a different layer than the first touch electrode lines, and the first connecting line is connected to the plurality of first touch electrode lines.

15 Claims, 9 Drawing Sheets

(56) References Cited

U.S. PATENT DOCUMENTS

| | | |
|---|---|---|
| 2013/0257794 A1 | 10/2013 | Lee et al. |
| 2014/0028616 A1 | 1/2014 | Furutani et al. |
| 2014/0043280 A1 | 2/2014 | Cok |
| 2014/0043288 A1 | 2/2014 | Kurasawa et al. |
| 2014/0062943 A1* | 3/2014 | Choi ............... G06F 3/0412 345/174 |
| 2014/0118277 A1 | 5/2014 | Kim et al. |
| 2014/0160066 A1 | 6/2014 | Kim et al. |
| 2014/0168149 A1 | 6/2014 | Han et al. |
| 2014/0168150 A1 | 6/2014 | Kim et al. |
| 2014/0168537 A1* | 6/2014 | Han ............... G06F 3/0412 349/12 |
| 2014/0285466 A1 | 9/2014 | Hayashi |

FOREIGN PATENT DOCUMENTS

| | | |
|---|---|---|
| CN | 103577017 A | 2/2014 |
| CN | 103793118 A | 5/2014 |
| CN | 103870056 A | 6/2014 |
| CN | 103870057 A | 6/2014 |
| CN | 103870082 A | 6/2014 |
| CN | 103870084 A | 6/2014 |
| TW | 201326998 A | 7/2013 |

\* cited by examiner

TOUCH DISPLAY APPARATUS

CROSS-REFERENCE TO RELATED APPLICATIONS

This application claims the benefit of Republic of Korea Patent Application No. 10-2015-0015517 filed on Jan. 30, 2015, and also Republic of Korea Patent Application No. 10-2015-0143597 Oct. 14, 2015, both of which are hereby incorporated by reference as if fully set forth herein.

BACKGROUND

Field of the Invention

The present invention relates to a touch sensitive apparatus which decreases a load of each of a plurality of touch electrodes and reduces a load deviation between the plurality of touch electrodes, thereby enhancing image quality.

Discussion of the Related Art

Instead of an input device such as a mouse, a keyboard, or the like which is conventionally applied as an input device of a liquid crystal display (LCD) apparatus, flat panel display apparatuses, a touch panel that enables a user to directly input information with a finger or a pen is applied to LCD apparatuses. Since all users can easily manipulate the touch screen, the application of the touch panel is being expanded.

Touch panels are categorized into a resistive type, a capacitance type, an infrared type, etc. depending on a touch sensing method. Recently, since the capacitance type provides convenience in a manufacturing process and is good in touch sensitivity, the capacitance type is attracting much attention. Capacitive touch panels are categorized into a mutual capacitance type and a self-capacitance type.

Recently, an in-cell touch type panel where a capacitive touch sensor is built into a liquid crystal panel has been developed for slimming LCD apparatuses to which a touch screen is applied. In-cell touch sensitive apparatuses use a common electrode, which is disposed on a thin film transistor (TFT) array substrate, as a touch sensor. In the following description, a touch sensitive panel denotes that a touch sensor is built into a liquid crystal panel in the in-cell touch type. Also, sensing of touch electrodes is performed in the self-capacitance type.

FIG. 1 is a diagram schematically illustrating a related art in-cell touch type touch sensitive apparatus, and FIG. 2 is a diagram illustrating a connection structure between a self-capacitive touch electrode and a touch signal line.

Referring to FIGS. 1 and 2, the related art in-cell touch type touch sensitive apparatus includes a touch sensitive panel, a touch driver 30, a display driver (not shown), and a backlight unit (not shown).

The touch sensitive panel includes a TFT array substrate and a color filter array substrate which are bonded to each other with a liquid crystal layer therebetween. A common electrode disposed on the TFT array substrate is patterned as a plurality of blocks, and thus, a plurality of touch electrodes 10 are provided. In FIG. 1, it is illustrated as an example that twenty touch electrodes 10 are disposed in a horizontal direction, and thirty touch electrodes 10 are disposed in a vertical direction in the touch sensitive panel, namely, a total of 600 touch electrodes 10 are disposed in the touch sensitive panel.

The related art in-cell touch type touch sensitive apparatus divides one frame period into a display period and a touch period and performs display driving and touch driving in a time division method.

During the display period, the related art in-cell touch type touch sensitive apparatus supplies a data voltage to a pixel electrode and supplies a common voltage (Vcom) to the plurality of touch electrodes 10, thereby displaying an image. During the touch period, the related art in-cell touch type touch sensitive apparatus supplies a touch driving signal to each of the plurality of touch electrodes 10 and then senses a capacitance of each of the plurality of touch electrodes 10, thereby determining whether there is a touch and detecting a touched position.

The touch driver 30 includes a touch signal generator, a sensing unit, and a plurality of multiplexers 32.

The plurality of multiplexers 32 are for decreasing the number of channels of the touch driver 30, and the plurality of multiplexers 32 having an input-to-output ratio of N:1 are disposed. Each of the plurality of touch electrodes 10 is connected to one touch signal line 20, which is connected to a channel of a corresponding multiplexer 32.

As illustrated in FIG. 2, a first touch electrode 12a is connected to a first touch signal line 22a through a plurality of contacts CNT. Also, a second touch electrode 12b is connected to a second touch signal line 22b through a plurality of contacts CNT. As described above, each of the plurality of touch electrodes is connected to a corresponding touch signal line through a plurality of contacts CNT.

The touch driving signal output from the touch signal generator is supplied to each of the plurality of touch electrodes 10 via a corresponding multiplexer 32. Also, the sensing unit senses the amount of electric charge charged into each of the touch electrodes 10 to determine whether there is a touch and detect a touched position.

FIG. 3 is a diagram illustrating a problem where image quality is degraded due to a load deviation of a touch electrode.

Referring to FIG. 3, the touch driving signal is applied to the touch electrode 12a through the touch signal line 22a, but a load deviation occurs in one touch electrode. Also, a load deviation occurs between a plurality of touch electrodes. For this reason, image quality is degraded.

For example, when twenty touch electrodes are arranged in a vertical direction, a load deviation occurs between a first electrode 12a, a tenth touch electrode 12b, and a twentieth touch electrode 12c. That is, when a touch electrode is close to a contact CNT that connects the touch electrode and a corresponding touch signal line, a load of the touch electrode is small, but as a touch electrode becomes farther away from a contact CNT that connects the touch electrode and a corresponding touch signal line, a load of the touch electrode increases.

When a load deviation occurs in one touch electrode and between a plurality of touch electrodes, a difference occurs in a time taken until the common electrode (Vcom) ripples and then returns to an original voltage value, and due to such a time difference, a difference of root mean square (RMS) values of voltages between regions occurs in a whole screen. For this reason, image quality is degraded.

SUMMARY

Accordingly, the present invention is directed to provide a touch sensitive apparatus that substantially obviates one or more problems due to limitations and disadvantages of the related art.

An aspect of the present invention is directed to provide a touch sensitive apparatus which reduces a load of a touch electrode, thereby enhancing image quality.

Another aspect of the present invention is directed to provide a touch sensitive apparatus which reduces a load deviation of a touch electrode, thereby enhancing image quality.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a touch sensitive apparatus including a touch sensitive panel where a plurality of touch electrodes are disposed, a touch driver configured to supply a touch driving signal to the plurality of touch electrodes and sense an amount of electric charge of each of the plurality of touch electrodes during a touch period, and a plurality of touch signal lines configured to respectively connect the plurality of touch electrodes to a plurality of channels included in the touch driver. Here, each of the plurality of touch electrodes may include a plurality of slits and may be disposed in a mesh form.

In the touch sensitive apparatus according to an embodiment of the present invention, one touch signal line may be disposed to overlap the plurality of slits.

In the touch sensitive apparatus according to an embodiment of the present invention, the plurality of slits may be disposed in a non-display area.

In another aspect of the present invention, there is provided a touch sensitive apparatus including a touch sensitive panel where a plurality of touch electrodes are disposed, a touch driver configured to supply a touch driving signal to the plurality of touch electrodes and sense an amount of electric charge of each of the plurality of touch electrodes during a touch period, a plurality of touch signal lines configured to respectively connect the plurality of touch electrodes to a plurality of channels included in the touch driver, and a plurality of connecting lines respectively connected to the plurality of touch electrodes.

In the touch sensitive apparatus according to an embodiment of the present invention, one touch signal line may be connected to a corresponding touch electrode through a plurality of first contacts, and one touch electrode may be connected to at least two connecting lines through a plurality of second contacts.

In the touch sensitive apparatus according to an embodiment of the present invention, the plurality of connecting lines may be disposed near the plurality of touch signal lines.

In the touch sensitive apparatus according to an embodiment of the present invention, the plurality of first connecting lines may be spaced apart from the plurality of second connecting lines.

In one embodiment, a touch sensitive display apparatus comprises a touch sensitive panel. The touch panel comprises a plurality of touch electrodes comprising at least a first touch electrode. The first touch electrode comprises a plurality of first touch electrode lines that are parallel to each other. A first touch signal line is connected to the plurality of first touch electrode lines of the first touch electrode, and the first touch electrode is driven for image display and touch sensing via the first touch signal line. A first connecting line is in a different layer than the first touch electrode lines, and the first connecting line is connected to the plurality of first touch electrode lines.

In one embodiment, a data line carries a data voltage to at least one pixel of the display panel. The data line is in a different layer than the first connecting line, is oriented in a same direction as the first connecting line and overlaps with the first connecting line. In one embodiment, the first touch signal line and the first connecting line are of a same material and located in a same layer.

In one embodiment, the first touch electrode is comprised of a first material, and the first connecting line is comprised of a second material having lower resistance than the first material. For example, the first touch electrode is comprised of indium tin oxide (ITO), and the first connecting line is comprised of metal having resistivity which is lower than that of ITO.

In one embodiment, the first touch electrode comprises a slit, and the first connecting line overlaps with the slit. The display panel may also comprise a pixel having a thin film transistor, wherein the first connecting line overlaps with the thin film transistor.

In one embodiment, the plurality of first touch electrode lines are perpendicular to the first touch signal line and the first connecting line.

In one embodiment, the display panel further comprises a second connecting line in a different layer than the first touch electrode lines and perpendicular to the first touch electrode lines, the second connecting line connected to the plurality of first touch electrode lines.

In one embodiment, the display panel further comprises a second touch electrode of the plurality of touch electrodes, the second touch electrode comprising a plurality of second touch electrode lines that are parallel to each other. A second touch signal line is connected to the plurality of second touch electrode lines of the second touch electrode, the second touch electrode driven for image display and touch sensing via the second touch signal line. A second connecting line is in a different layer than the second touch electrode lines, the second connecting line connected to the plurality of second touch electrode lines.

In one embodiment, a driver circuit drives the display panel in a display period and a touch period. The driver circuit supplies a common voltage for image display to the first touch electrode via the first touch signal line during the display period, and supplies a touch driving signal to the first touch electrode via the first touch signal line during the touch period.

In one embodiment, the first connecting line is connected to the plurality of first touch electrode lines via a plurality of first contacts. Additionally, the plurality of first contacts are in contact holes in an insulation layer between the first connecting line and the first touch electrode lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
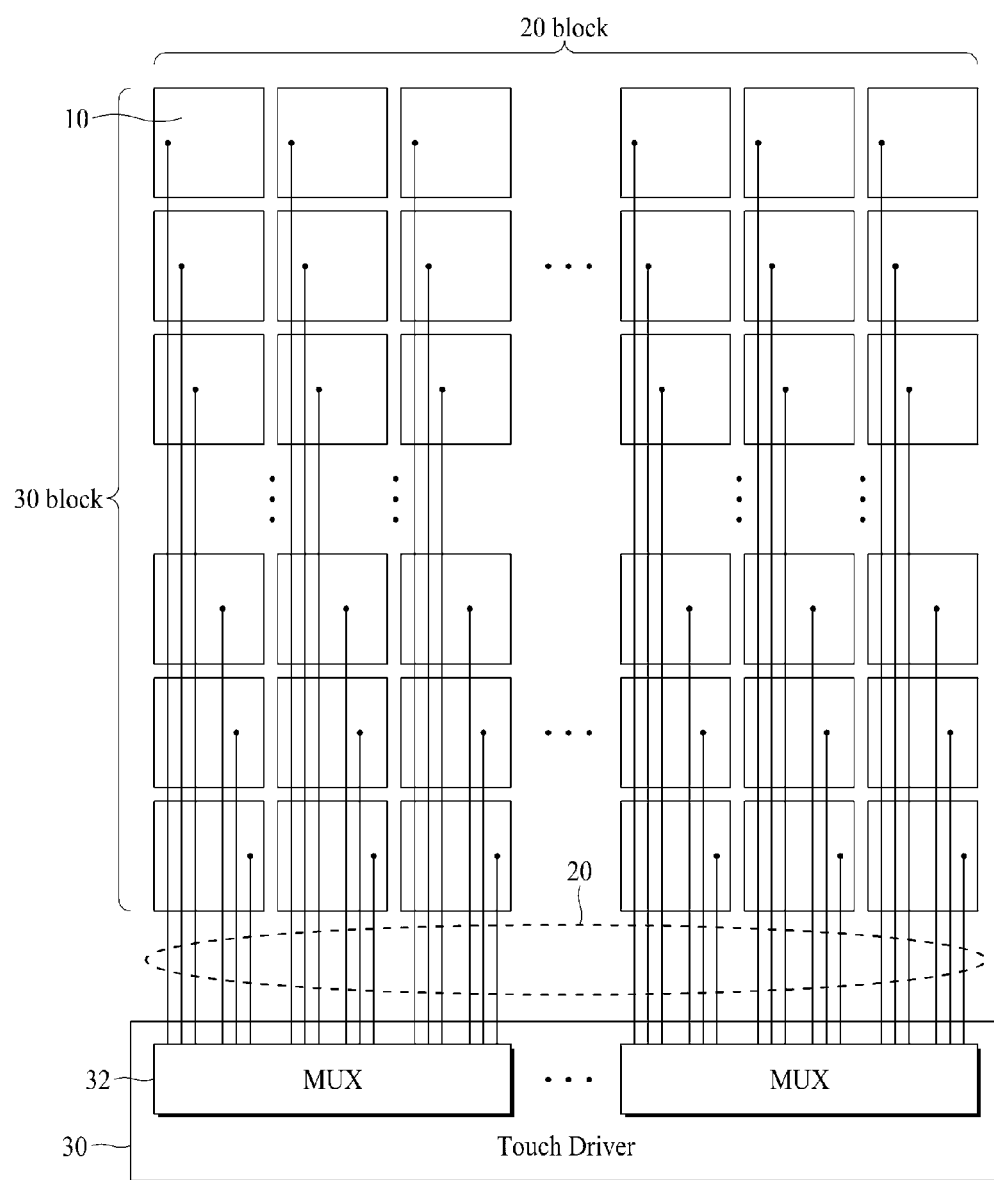
FIG. 1 is a diagram schematically illustrating a related art in-cell touch type touch sensitive apparatus.
Figure 2:
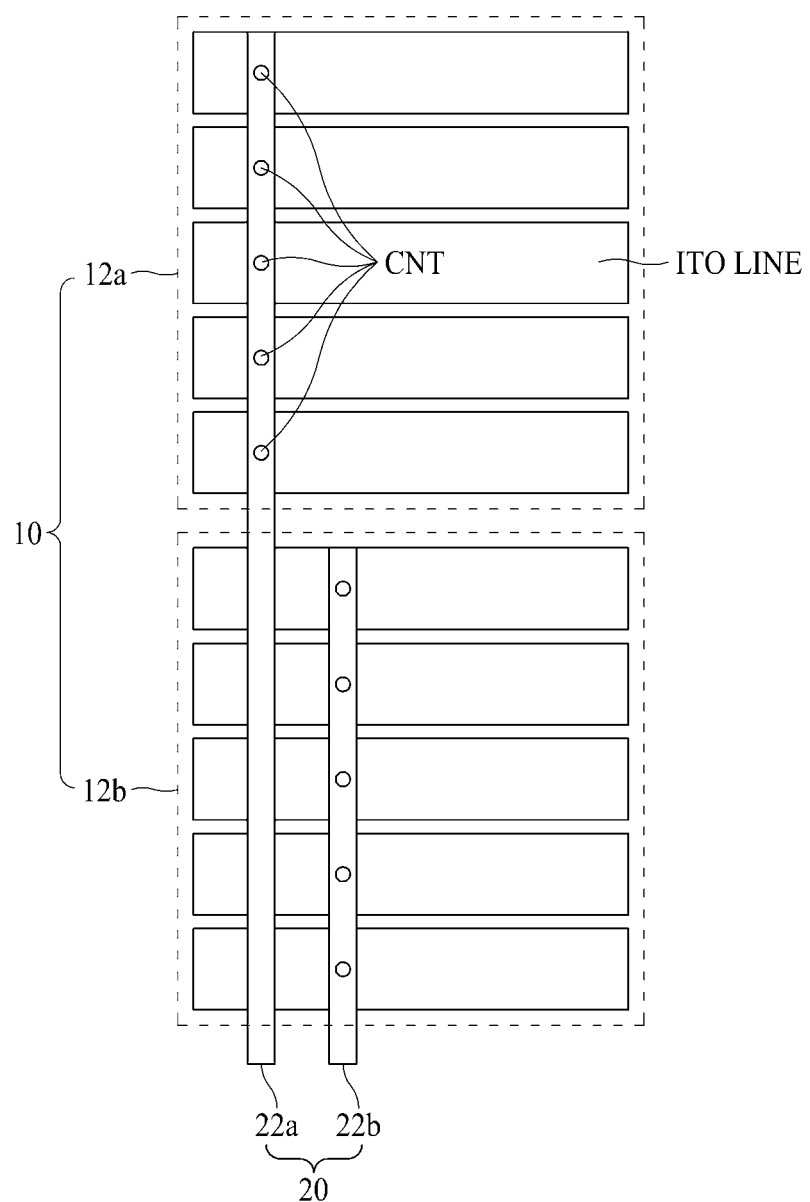
FIG. 2 is a diagram illustrating a connection structure between a self-capacitive touch electrode and a touch signal line.
Figure 3:
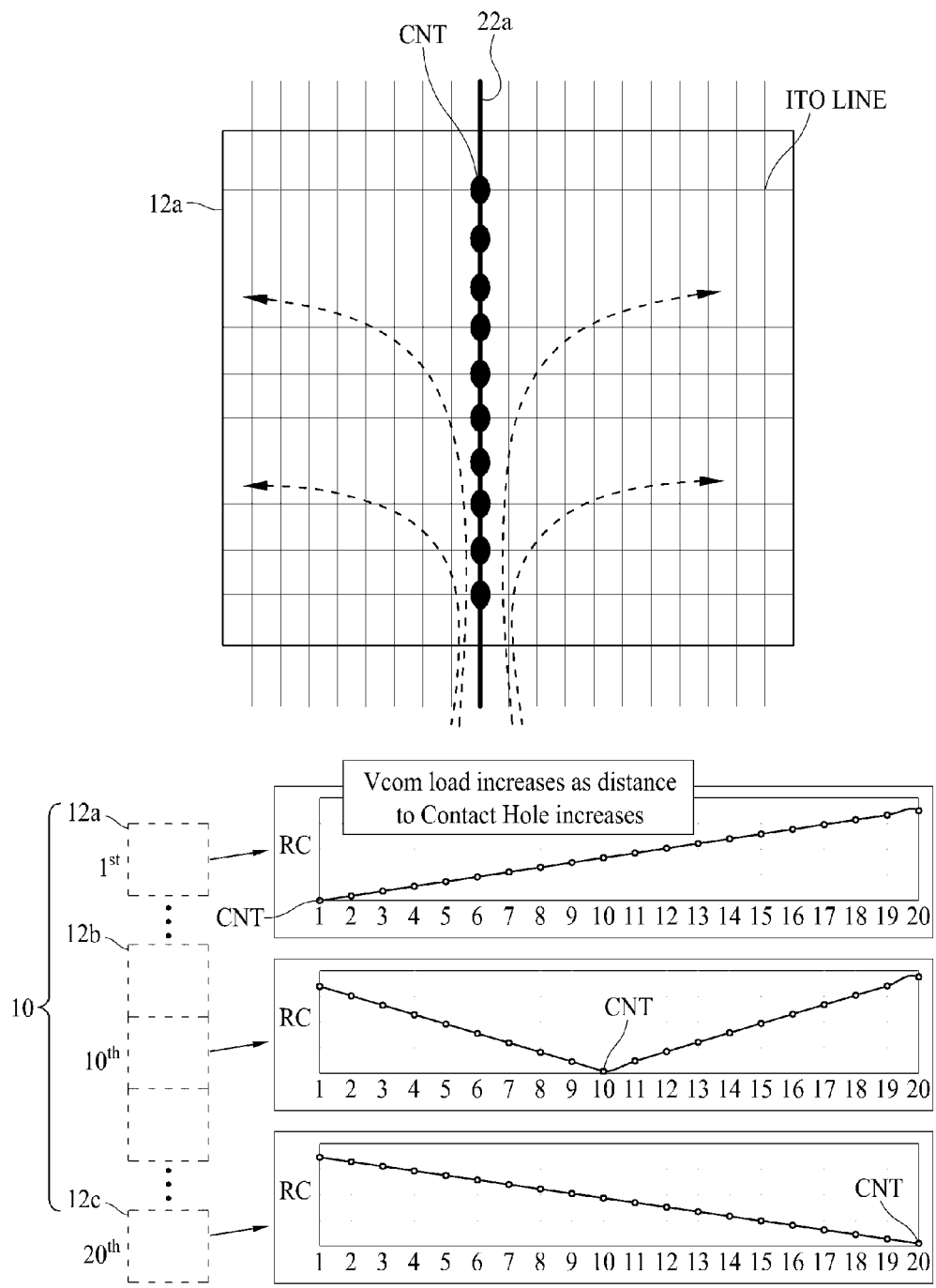
FIG. 3 is a diagram illustrating a problem where image quality is degraded due to a load deviation of a touch electrode.

Reference will now be made in detail to the exemplary embodiments of the present invention, examples of which are illustrated in the accompanying drawings. Wherever possible, the same reference numbers will be used throughout the drawings to refer to the same or like parts.

In the specification, it should be noted that like reference numerals already used to denote like elements in other drawings are used for elements wherever possible. In the following description, when a function and a configuration known to those skilled in the art are irrelevant to the essential configuration of the present invention, their detailed descriptions will be omitted. The terms described in the specification should be understood as follows.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Furthermore, the present invention is only defined by scopes of claims.

In the specification, in adding reference numerals for elements in each drawing, it should be noted that like reference numerals already used to denote like elements in other drawings are used for elements wherever possible.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

LCD devices have been variously developed in a twisted nematic (TN) mode, a vertical alignment (VA) mode, an in-plane switching (IPS) mode, and a fringe field switching (FFS) mode depending on to a method of adjusting the alignment of liquid crystal.

Among the modes, the TN mode and the VA mode are modes in which a pixel electrode is disposed on a lower substrate, and a common electrode is disposed on an upper substrate (a color filter array substrate), thereby adjusting the alignment of liquid crystal with a vertical electric field.

The IPS mode and the FFS mode are modes in which a pixel electrode and a common electrode are disposed on a lower substrate, and the alignment of liquid crystal is adjusted with an electric field between the pixel electrode and the common electrode.

The IPS mode is a mode in which a plurality of pixel electrodes and a plurality of common electrodes are alternately arranged in parallel, and thus, a lateral electric field is generated between a pixel electrode and a common electrode adjacent to each other, thereby adjusting the alignment of liquid crystal.

The FFS mode is a mode in which a pixel electrode and a common electrode are provided in plurality to be spaced apart from each other with an insulating layer therebetween. In this case, one electrode of the pixel electrodes and common electrodes are formed in a plate shape or a pattern, and the other electrode is formed in a finger shape. The FFS mode is a mode that adjusts the alignment of liquid crystal with fringe fields generated between the pixel electrodes and common electrodes.

A mode of a touch panel according to an embodiment of the present invention is not limited, and a vertical alignment mode (the TN mode and the VA mode) and an in-plane switching mode (the IPS mode and the FFS mode) may be applied to the touch panel according to an embodiment of the present invention. In this disclosure below, the IPS mode or the FFS mode may be applied to the touch panel according to an embodiment of the present invention for example.

Hereinafter, a touch sensitive apparatus according to embodiments of the present invention will be described in detail with reference to the accompanying drawings.

Figure 4:
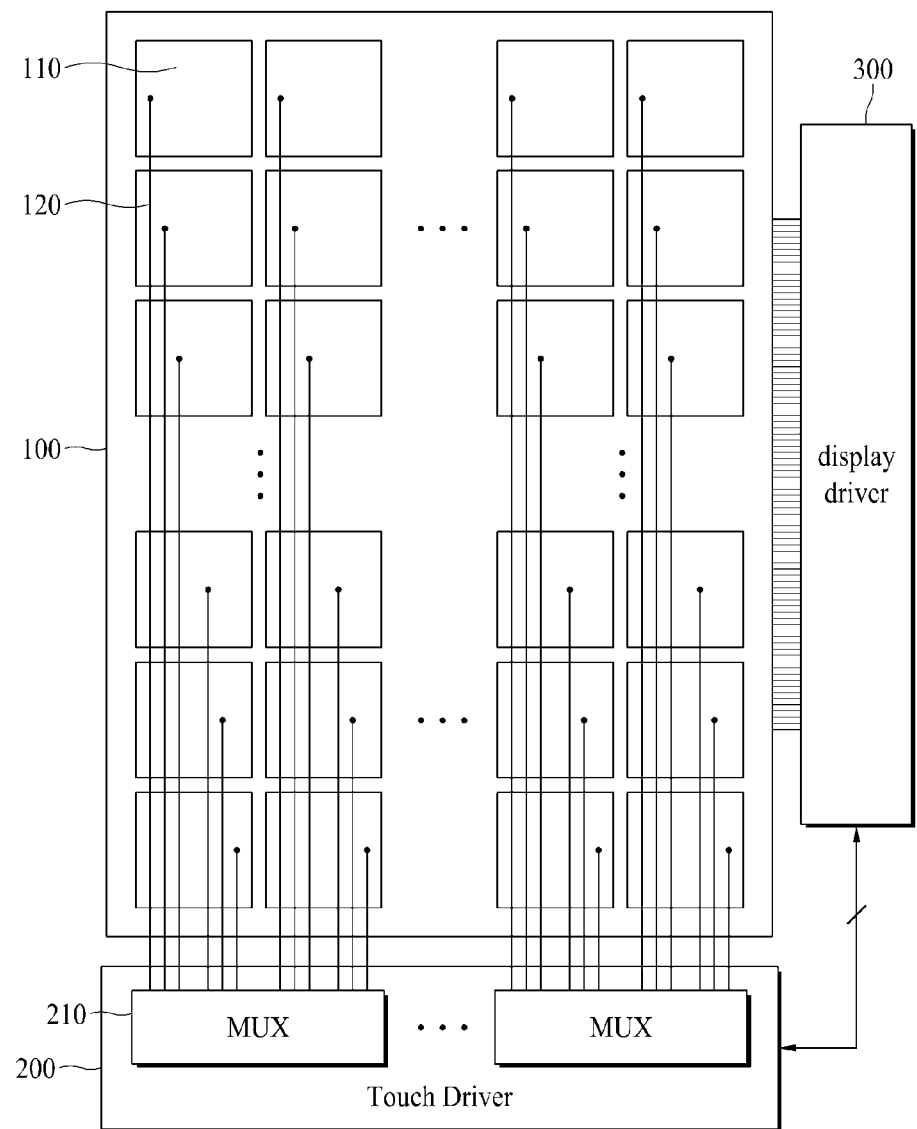
FIG. 4 is a diagram schematically illustrating a touch sensitive apparatus according to an embodiment of the present invention.

FIG. 4 is a diagram schematically illustrating a touch sensitive apparatus according to an embodiment of the present invention.

Referring to FIG. 4, the touch sensitive apparatus according to an embodiment of the present invention may include a touch sensitive panel 100, a touch driver 200, a display driver 300, and a backlight unit. In FIG. 4, the backlight unit is not illustrated.

The touch sensitive panel 100 may include a thin film transistor (TFT) array substrate, a color filter array substrate, and a liquid crystal layer disposed therebetween.

A plurality of pixels (not shown) may be arranged on the TFT array substrate in a matrix type. Also, a plurality of RGB color filters may be disposed on the color filter array substrate to respectively correspond to the plurality of pixels, and a plurality of black matrixes that define respective opening areas of the plurality of pixels and prevent colors from being mixed with each other may be disposed on the color filter array substrate.

The plurality of pixels may be defined by a plurality of data lines and a plurality of gate lines which intersect each other. A TFT, a pixel electrode, and a storage capacitor (Cst) may be disposed in each of a plurality of areas defined by intersections of the data lines and the gate lines. Also, a plurality of touch electrodes 110 may be disposed. The pixel electrode and a common electrode may each be formed of a transparent conductive material such as indium tin oxide (ITO) and/or the like.

In the present embodiment, the common electrode may be used as the touch electrode 10, in addition to an electrode for displaying an image. To this end, the plurality of touch electrodes 110 may be provided by patterning the common electrode in units of pixels.

For example, twenty touch electrodes 110 are disposed in a horizontal direction, and thirty-two touch electrodes 110 are disposed in a vertical direction in the touch sensitive panel, namely, a total of 640 touch electrodes 110 are disposed in the touch sensitive panel 100. However, the present embodiment is not limited thereto. In other embodiments, the number of the touch electrodes 110 disposed in the touch sensitive panel 100 may be changed depending on a screen size and a setting of touch sensitivity.

Each of the touch electrodes 110 may be connected to a corresponding channel of the touch driver 200 through a corresponding touch signal line 120 among a plurality of touch signal lines 120 which are each formed of a conductive material. Each touch electrode 110 is shared by a respective block of pixels (not shown) and serves as the display electrode for the respective block of pixels. For an LCD display, voltage differences between the touch electrode 110 and pixel electrodes of the individual pixels create electrical fields. The electric fields twist the LCD crystals and allow light to pass through the pixels.

The touch sensitive apparatus according to an embodiment of the present invention may separately execute a display period and a touch period to perform an operation of displaying an image and an operation of sensing a touch. For example, the touch sensitive apparatus may divide one frame period into the display period and the touch period and may perform display driving and touch driving in a time division method.

During the display period, the touch sensitive apparatus may supply a data voltage to the pixel electrode and may supply a common voltage (Vcom) to the plurality of touch electrodes 110 via the touch signal lines 120, thereby displaying an image. During the touch period, the touch sensitive apparatus may supply a touch driving signal to each of the plurality of touch electrodes 110 via the touch signal lines 120 and then may sense a capacitance charged into each of the plurality of touch electrodes 110, thereby determining whether there is a touch and detecting a touched position.

The display driver 300 may include a gate driver, a data driver, and a timing controller. All or some of the gate driver, the data driver, and the timing controller may be disposed in the touch sensitive panel 100 in a chip-on glass (COG) type or a chip-on film (COF, chip-on flexible printed circuit) type.

When the touch sensitive panel 100 is manufactured in a small size and is applied to a mobile device, the gate driver, the data driver, and the timing controller may be implemented as one chip.

The gate driver may be integrated on a substrate of the liquid crystal panel 100 in an amorphous silicon gate (ASG) type or a gate-in panel (GIP) type.

The timing controller may convert input RGB image signals into frame-unit digital RGB image data and may supply the RGB image data to the data driver according to a timing signal (TS). In this case, the timing signal (TS) may include a vertical sync signal (V-sync), a horizontal sync signal (H-sync), a clock signal (CLK), etc.

Moreover, the timing controller may generate a gate control signal (GCS) for controlling the gate driver by using the timing signal (TS) to supply the gate control signal to the gate driver. The gate control signal (GCS) may include a gate start pulse (GSP), a gate shift clock (GSC), a gate output enable signal (GOE), etc.

Moreover, the timing controller may generate a data control signal (DCS) for controlling the data driver by using the timing signal (TS) and may supply the data control signal to the data driver. Here, the data control signal (DCS) may include a source start pulse (SSP), a source sampling clock (SSC), a source output enable signal (SOE), a polarity control signal (POL), etc.

Moreover, the timing controller may supply a sync signal of each of the display period and the touch period to the touch driver 200 in order for the touch driver 200 to be driven during the touch period.

The gate driver may generate a gate driving signal for driving the TFT included in each of the plurality of pixels, based on the gate control signal (GCS) from the timing controller. The gate driver may be implemented as a separate chip, or may be built into the TFT array substrate of the touch sensitive panel 100 in the GIP type.

The gate driver may sequentially supply the gate driving signal to the plurality of gate lines included in the liquid crystal panel during the display period in one frame period. The TFT included in each of the plurality of pixels may be turned on according to the gate driving signal.

The data driver may convert the digital RGB image data, supplied from the timing controller, into analog image signals, namely, RGB data voltages. Also, the data driver may respectively supply the data voltages to the plurality of data lines at a time when the TFT of each pixel is turned according to the gate driving signal, based on the data control signal DCS from the timing controller.

Data voltages may be respectively supplied to a plurality of pixels connected to each of the plurality of gate lines disposed in the touch sensitive panel 100. That is, when a first gate driving signal is supplied to a first gate line, data voltages which are to be respectively supplied to a plurality of pixels connected to the first gate line may be supplied to the plurality of data lines. Likewise, when a second gate driving signal is supplied to a second gate line, data voltages which are to be respectively supplied to a plurality of pixels connected to the second gate line may be supplied to the plurality of data lines.

Data voltages may be respectively supplied to the plurality of pixels, and the common voltage (Vcom) may be supplied to the plurality of touch electrodes 110, thereby displaying an image. The data driver may generate the common voltage (Vcom) and supply the common voltage (Vcom) to the plurality of touch electrodes 110 via the touch signal lines 120. As another example, the touch driver 200 may generate the common voltage (Vcom) and supply the common voltage (Vcom) to the plurality of touch electrodes 110 via the touch signal lines 120.

The touch driver 200 may include a signal generator, which generates the touch driving signal supplied to the plurality of touch electrodes 110, and a sensing unit that executes a touch algorithm, based on a touch signal received from each of the plurality of touch electrodes 110.

Moreover, the touch driver 200 may include a plurality of multiplexers 210 having an input-to-output ratio of N:1 for decreasing the number of channels of the touch driver 200. The plurality of multiplexers 210 may be disposed between input/output terminals of the touch driver 200 and a plurality of touch sensing lines 120, thereby decreasing the total number of the channels of the touch driver 200 by 1/N.

The touch driver 200 may supply the touch driving signal to the plurality of touch electrodes 110 during the touch period, based on the sync signal supplied from the timing controller. In this case, the touch driving signal applied to the touch electrodes 110 may be generated in various forms such as a square-wave pulse, a sine wave, a triangular wave, etc. Subsequently, the touch driver 200 may sense the capacitance charged into each of the plurality of touch electrodes 110. The touch driver 200 may determine whether there is a touch and may detect a touched position, based on the capacitance charged into each of the plurality of touch electrodes 110.

Hereinabove, the touch driver 200 and the display driver 300 have been described as being separately implemented, but are not limited thereto. In other embodiments, the touch driver 200 and the display driver 300 may be integrated and implemented as one body.

Figure 5:
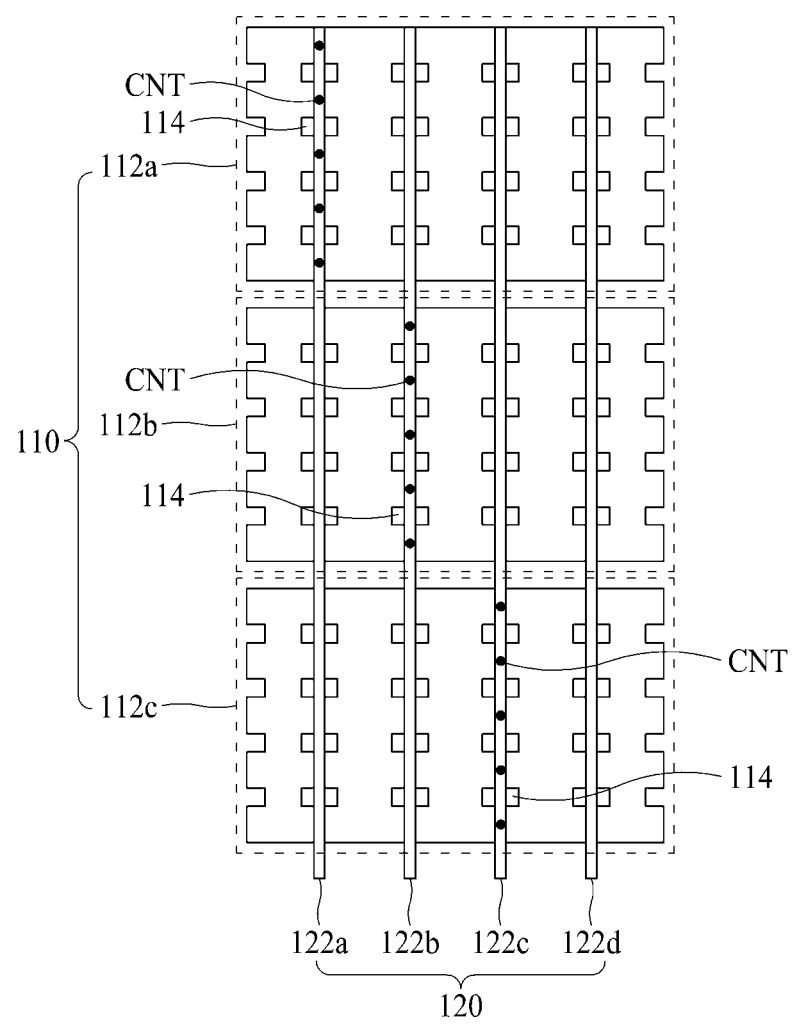
FIG. 5 illustrates a touch sensitive apparatus according to a first embodiment of the present invention and is a diagram illustrating an arrangement structure of a touch electrode and a touch signal line.

FIG. 5 illustrates a touch sensitive apparatus according to a first embodiment of the present invention and is a diagram illustrating an arrangement structure of a touch electrode and a touch signal line.

Referring to FIG. 5, first to third touch electrodes 112a to 112c of all a plurality of touch electrodes 110 are illustrated. Also, first to fourth touch signal lines 122a to 122d of all a plurality of touch signal lines 120 are illustrated.

In the touch sensitive apparatus according to the first embodiment of the present invention, each of the plurality of touch electrodes 110 may be provided in a mesh form, and thus, an internal load deviation of each of the plurality of touch electrodes 10 is reduced, and a load deviation between the plurality of touch electrodes is reduced.

To provide a detailed description, each of the first to third touch electrodes 112a to 112c may include a plurality of slits 114. A slit 114 is an opening or hole in the touch electrodes 112a to 112c and may be surrounded by the touch electrodes 112a to 112c. The plurality of slits 114 may be provided by patterning the first to third touch electrodes 112a to 112c having a plate shape, and the first to third touch electrodes 112a to 112c may have a mesh form due to the plurality of slits 114. In this case, the plurality of slits 114 may be disposed in a non-display area so as not to affect an operation of generating an electric field with the pixel electrode in display driving.

Moreover, each of the touch signal lines 120 may be disposed to overlap the plurality of slits 114. As described above, since each of the touch signal lines 120 is disposed to overlap the plurality of slits 114, a load of each touch electrode is reduced, and an overlap capacitance between the touch signal line and the touch electrode is reduced. Accordingly, a degree to which image quality is degraded due to the overlap capacitance is reduced.

The plurality of touch electrodes 110 and the plurality of touch signal lines 120 may be disposed to overlap each other with an insulation layer therebetween. Each of the plurality of touch electrodes 110 may be connected to one or more touch signal lines 120.

For example, the first touch electrode 112a may be connected to the first touch signal line 122a through a plurality of contacts CNT. In this case, the first touch signal line 122a may be connected to the first touch electrode 112a, but may be insulated from the other touch electrodes.

The second touch electrode 112b may be connected to the second touch signal line 122b through a plurality of contacts CNT. In this case, the second touch signal line 122b may be connected to the second touch electrode 112b, but may be insulated from the other touch electrodes.

The third touch electrode 112c may be connected to the third touch signal line 122c through a plurality of contacts CNT. In this case, the third touch signal line 122c may be connected to the third touch electrode 112c, but may be insulated from the other touch electrodes.

In the drawing, one touch electrode may be connected to one touch signal line, but the present embodiment is not limited thereto. In other embodiments, one touch electrode may be connected to two or more touch signal lines. If one touch electrode is connected to a plurality of touch signal lines, a load of each touch electrode is reduced.

The plurality of touch signal lines 120 may be respectively connected to the channels of the touch driver 200. Therefore, the touch driving signal output from the touch driver 200 may be applied to and charged into each of the plurality of touch electrodes 110. Also, the touch driver 200 may sense an amount of electric charge charged into each of the plurality of touch electrodes 110 by using the plurality of touch signal lines 120.

The touch sensitive apparatus according to the first embodiment of the present invention including the above-described elements decreases a load of each of the plurality of touch electrodes 110, thereby enhancing image quality. Also, the touch sensitive apparatus according to the first embodiment of the present invention reduces a load deviation between the plurality of touch electrodes 110, thereby enhancing image quality.

Figure 6:
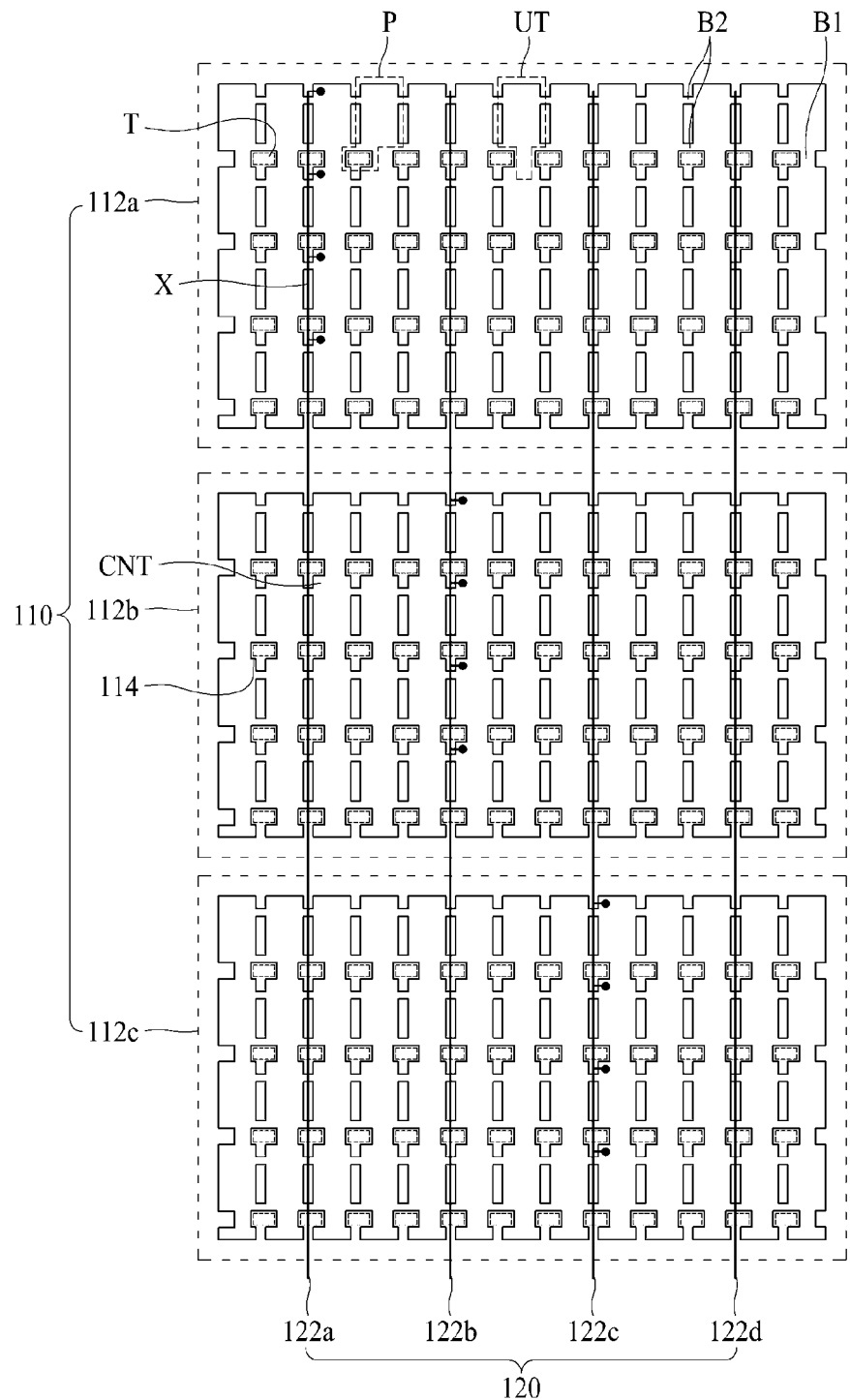
FIG. 6 illustrates in detail the touch sensitive apparatus according to the first embodiment of the present invention and is a diagram illustrating an arrangement structure of the touch electrode and the touch signal line illustrated in FIG. 5.

FIG. 6 illustrates in detail the touch sensitive apparatus according to the first embodiment of the present invention and is a diagram illustrating an arrangement structure of the touch electrode and the touch signal line illustrated in FIG. 5. In the following description, details which are the same as or similar to the details described above with reference to FIG. 5 are not repeated or will be briefly described.

Referring to FIG. 6, in the touch sensitive apparatus according to the first embodiment of the present invention, each of the plurality of touch electrodes 110 may be provided in a mesh form, and thus, an internal load deviation of each of the plurality of touch electrodes 10 is reduced, and a load deviation between the plurality of touch electrodes is reduced.

Each of the first to third touch electrodes 112a to 112c may include a plurality of slits 114. The plurality of slits 114 may be disposed in a non-display area.

For example, as illustrated in FIG. 6, each of the plurality of slits 114 may be disposed in an area where a thin film transistor (TFT) T driving a corresponding pixel P is disposed. To provide an additional description, the area where the TFT T is disposed may not be covered by the touch electrodes.

Each of the first to third touch electrodes 112a to 112c may include a plurality of unit touch electrodes UT. Each of the plurality of unit touch electrodes UT may correspond to the pixel P.

Each of the first to third touch electrodes 112a to 112c may include a plurality of first bridges B1 and a plurality of second bridges B2. The first bridges B1 and the second bridges B2 may electrically connect the unit touch electrodes UT adjacent to each other. Particularly, each of the first bridges B1 may electrically connect two unit touch electrodes UT which are adjacent to each other along a corresponding gate line. Each of the second bridges B2 may electrically connect two unit touch electrodes UT which are adjacent to each other along a corresponding data line.

To provide an additional description, the first bridges B1 may be disposed to overlap the gate lines or to be parallel to the gate lines. The second bridges B2 may be disposed to overlap the data lines or to be parallel to the data lines.

Moreover, the plurality of touch signal lines 120 may respectively be disposed to overlap the plurality of slits 114. The unit touch electrodes may be spaced from each other by the second bridges, and the touch signal lines 120 may be disposed along an area X which is provided between the unit touch electrodes by the second bridges B2. As described above, since the plurality of touch signal lines 120 are respectively disposed to overlap the plurality of slits 114, a load in each of the touch electrodes is reduced, and an overlap capacitance between a corresponding touch signal line and a corresponding touch electrode is reduced. Accordingly, image quality is prevented from being degraded due to the overlap capacitance.

Figure 7:
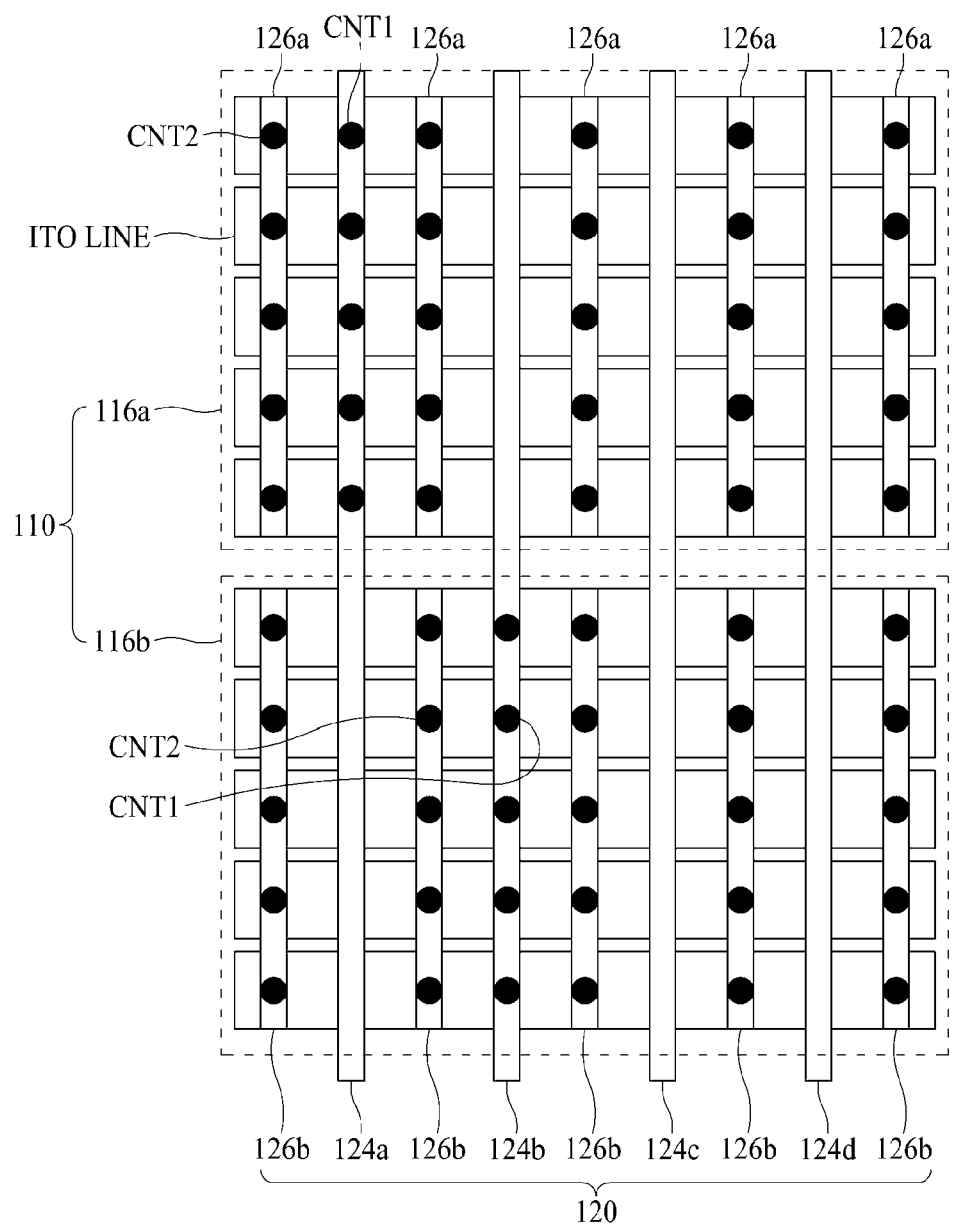
FIG. 7 illustrates a touch sensitive apparatus according to a second embodiment of the present invention and is a diagram illustrating an arrangement structure of a touch electrode, a touch signal line, and a connecting line.

FIG. 7 illustrates a touch sensitive apparatus according to a second embodiment of the present invention and is a diagram illustrating an arrangement structure of a touch electrode, a touch signal line, and a connecting line.

Referring to FIG. 7, first and second touch electrodes 116a and 116b of a plurality of touch electrodes 110 are illustrated. Each touch electrode 110 includes multiple touch electrode lines made from ITO (ITO Line). The ITO lines extend in the horizontal direction and are parallel to each other. Also, first to fourth touch signal lines 124a to 124d of a plurality of touch signal lines 120 are illustrated. Also, a plurality of first connecting lines 126a and a plurality of second connecting lines 126b among all connecting lines for reducing a load of each of the plurality of touch electrodes 110 are illustrated. The touch signal lines 120 and the connecting lines 126 extend in a vertical direction and are perpendicular to and intersect the ITO lines.

In the touch sensitive apparatus according to a second embodiment of the present invention, the plurality of touch electrodes 110 and the plurality of touch signal lines 120 may be disposed to overlap each other with an insulation layer therebetween. Each of the plurality of touch electrodes 110 may be connected to one or more touch signal lines 120 through a plurality of first contacts CNT1 at different locations.

Moreover, the first and second connecting lines 126a and 126b may be disposed to overlap each of the plurality of touch electrodes 110, and each of the plurality of touch electrodes 110 may be connected to a plurality of connecting lines 126 through a second contact CNT2. A connecting line 126 is a line of conductive material that connects different ITO lines of a touch electrode 110 to each other. By connecting together different ITO lines, the connecting lines 126 reduces an internal load deviation of each of the touch electrodes 110, and a load deviation between the plurality of touch electrodes 110 is reduced.

For example, the first touch electrode 116a may be connected to the first touch signal lines 124a through a plurality of contacts CNT1. For the first touch electrode 116a, each contact CNT1 connects a single ITO line to a first touch signal line 124a. In this case, the first touch signal line 124a may be connected to the first touch electrode 116a, but may be insulated from the other touch electrodes 116.

The second touch electrode 116b may be connected to the second touch signal line 124b through a plurality of contacts CNT1. For the second touch electrode 116b, each contact CNT1 connects a single ITO line to the second touch signal line 124b. In this case, the second touch signal line 124b may be connected to the second touch electrode 116b, but may be insulated from the other touch electrodes.

Although not shown, a third touch electrode may be connected to the third touch signal line 124c through a plurality of contacts CNT1. In this case, the third touch signal line 124c may be connected to the third touch electrode, but may be insulated from the other touch electrodes.

In the drawing, one touch electrode 110 may be connected to one touch signal line, but the present embodiment is not limited thereto. In other embodiments, one touch electrode may be connected to two or more touch signal lines.

The plurality of touch signal lines 120 may be respectively connected to the channels of the touch driver 200. Therefore, the touch driving signal output from the touch driver 200 may be applied to and charged into each of the plurality of touch electrodes 110. Also, the touch driver 200 may sense an amount of electric charge charged into each of the plurality of touch electrodes 110 by using the plurality of touch signal lines 120. HERE A plurality of connecting lines 126 may be disposed to overlap each of the plurality of touch electrodes 110. The plurality of first connecting lines 126a may be disposed to overlap the first touch electrodes 116a. The first touch electrode 116a may be connected to the first connecting lines 126a through a plurality of second contacts CNT2. For the first touch electrode 116a, each contact CNT2 connects a single ITO line to a single first touch signal line 124a.

Here, the plurality of first connecting lines 126a may be disposed near a plurality of touch signal lines 124a to 124d. As described above, the first touch electrode 116a may be connected to the first touch signal line 124a through the plurality of first contacts CNT1, and the first touch electrode 116a may be connected to the plurality of first connecting lines 126a through the plurality of second contacts CNT2, thereby decreasing a load of the first touch electrode 116a. Also, a position-based load deviation that occurs in the first touch electrode 116a is reduced.

The plurality of second connecting lines 126b may be disposed to overlap the second touch electrode 116b. The second touch electrode 116b may be connected to the second connecting line 126b through a plurality of second contacts CNT2. For the second touch electrode 116b, each contact CNT2 connects a single ITO line to a single second touch signal line 124b.

Here, the plurality of second connecting lines 126b may be disposed near the plurality of touch signal lines 124a to 124d. As described above, the second touch electrode 116b may be connected to the second touch signal line 124b through the plurality of first contacts CNT1, and the second touch electrode 116b may be connected to the plurality of second connecting lines 126b through the plurality of second contacts CNT2, thereby decreasing a load of the second touch electrode 116b. Also, a position-based load deviation that occurs in the second touch electrode 116b is reduced.

The plurality of first connecting lines 126a may not be connected to the plurality of second connecting lines 126b but may be spaced apart from the plurality of second connecting lines 126b. That is, the plurality of touch signal lines 124a to 124d should be connected to the channels of the touch driver 200, and thus may be disposed to overlap the other touch electrodes in addition to a touch electrode connected thereto. On the other hand, the plurality of first connecting lines 126a may overlap the first touch electrode 116a, but may not overlap other touch electrodes. Also, the plurality of second connecting lines 126b may overlap the second touch electrode 116b, but may not overlap other touch electrodes.

The touch sensitive apparatus according to the second embodiment of the present invention including the above-described elements decreases a load of each of the plurality of touch electrodes 110, thereby enhancing image quality. Also, the touch sensitive apparatus according to the first embodiment of the present invention reduces a load deviation that occurs in one touch electrode 110 and between the plurality of touch electrodes 110, thereby enhancing image quality.

In the above-described method of driving the touch sensitive apparatus according to an embodiment of the present invention, a plurality of touch electrodes may be sensed through one channel of the touch driver 200. Accordingly, the number of channels of the touch driver 200 is reduced, and thus, a size of the touch driver 200 is reduced, and the manufacturing cost of a touch sensitive apparatus is reduced.

Figure 8:
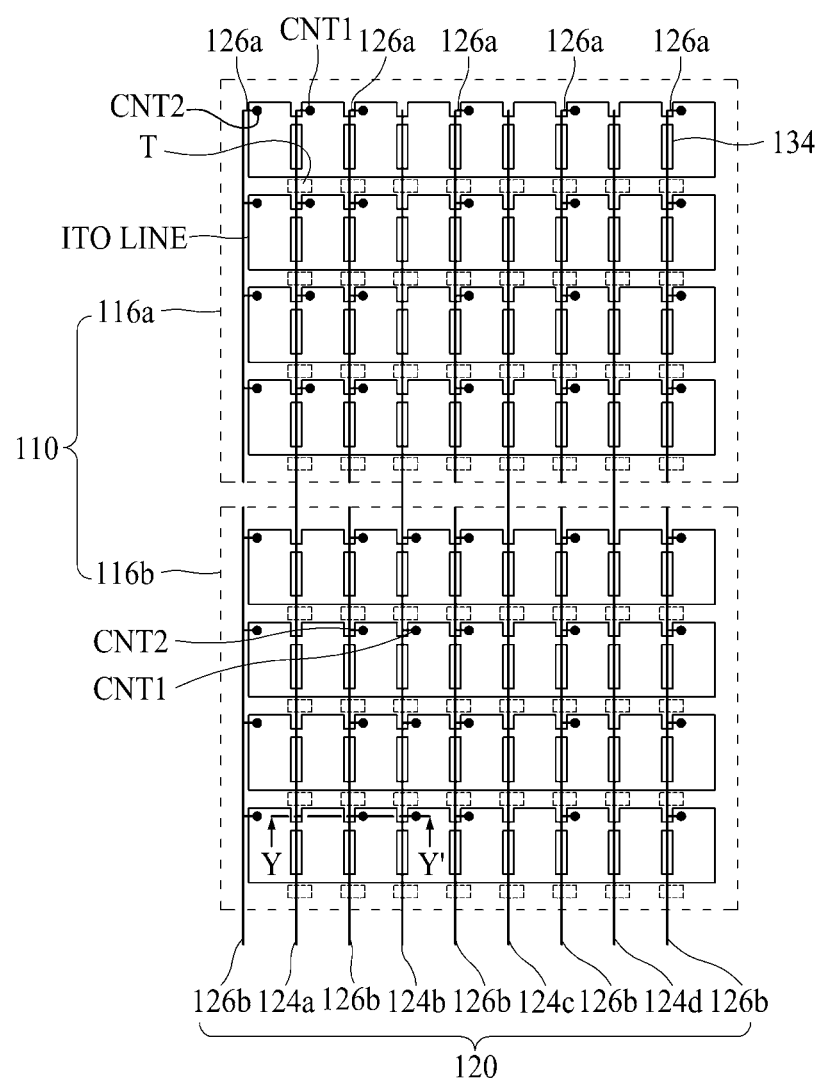
FIG. 8 illustrates in detail the touch sensitive apparatus according to the second embodiment of the present invention and is a diagram illustrating an arrangement structure of the touch electrode, the touch signal line, and the connecting line illustrated in FIG. 7.
Figure 9:
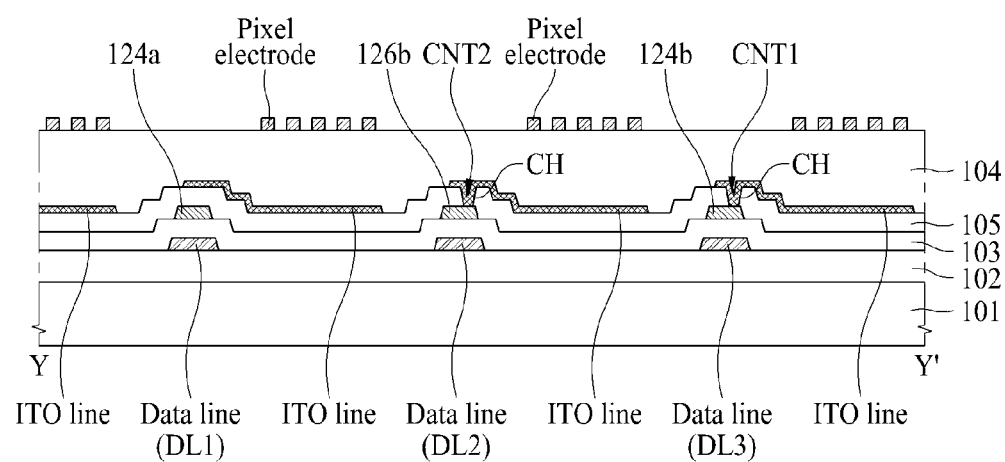
FIG. 9 is an exemplary diagram illustrating a cross-sectional surface taken along line Y-Y' of FIG. 8, and particularly, is an exemplary diagram illustrating a lower substrate of the display panel.

FIG. 8 illustrates in detail the touch sensitive apparatus according to the second embodiment of the present invention and is a diagram illustrating an arrangement structure of the touch electrode, the touch signal line, and the connecting line illustrated in FIG. 7. In the following description, details which are the same as or similar to the details described above with reference to FIG. 7 are not repeated or will be briefly described. FIG. 9 is an exemplary diagram illustrating a cross-sectional surface taken along line Y-Y' of FIG. 8, and particularly, is an exemplary diagram illustrating a lower substrate of the display panel 100. In FIG. 9, reference numeral "101" refers to a base substrate, reference numeral "102" refers to a gate insulation layer, reference numeral "103" refers to a first passivation layer, and reference numeral "104" refers to a second passivation layer.

Referring to FIG. 8, in the touch sensitive apparatus according to a second embodiment of the present invention, the plurality of touch electrodes 110 and the plurality of touch signal lines 120 may be disposed to overlap each other with an insulation layer therebetween. Each of the plurality of touch electrodes 110 may be connected to one or more touch signal lines 120 through a plurality of first contacts CNT1.

Moreover, the first and second connecting lines 126a and 126b may be disposed to overlap each of the plurality of touch electrodes 110, and each of the plurality of touch electrodes 110 may be connected to a plurality of connecting lines through a second contact CNT2. Therefore, an internal load deviation of each of the touch electrodes 110 is reduced, and a load deviation between the plurality of touch electrodes 110 is reduced.

The connecting lines 126a and 126b and the touch signal lines 124a to 124d may each be formed of metal having resistivity which is lower than that of each of the touch electrodes 116a and 116b. Therefore, a load of each of the plurality of touch electrodes 110 is reduced, and thus, image quality is enhanced.

For example, the touch electrodes 116a and 116b may each be formed of a transparent conductive material such as indium tin oxide (ITO) and/or the like. The connecting lines 126a and 126b and the touch signal lines 124a to 124d may each be formed of metal having resistivity which is lower than that of ITO, for example, aluminum (Al) or may be formed of a triple layer including molybdenum (Mo), Al, and Mo.

Materials forming the connecting lines 126a and 126b and the touch signal lines 124a to 124d may be applied to the touch signal lines 122a to 122d applied to the first embodiment of the present invention. Therefore, the touch signal lines 122a to 122d applied to the first embodiment of the present invention may have metal having resistivity which is lower than that of material forming the touch electrodes 112a to 112c.

Moreover, the touch electrodes 112a and 112b applied to the first embodiment of the present invention may include a transparent conductive material such as indium tin oxide (ITO) and metal having resistivity which is lower than that of indium tin oxide (ITO). In this case, the indium tin oxide (ITO) is provided in a mesh form as shown in FIGS. 5 and 6 and the metal having resistivity which is lower than the indium tin oxide (ITO) may be formed along to the gate lines covered by the indium tin oxide (ITO) or the data lines covered by the indium tin oxide (ITO).

In the first embodiment of the present invention, each of the touch electrodes 112a to 112c is provided in a mesh form. Similarly, in the touch sensitive according to the second embodiment of the present invention, each of the touch electrodes 116a and 116b may be provided in a mesh form.

To provide a detailed description, in FIGS. 7 and 8, the first touch electrode 116a may include a slit 134. For example, a plurality of slits 134 may be provided by patterning the first touch electrode 116a having a plate shape, and the first touch electrode 116a may have a mesh form due to the plurality of slits 134.

Moreover, as shown in FIGS. 7 and 8, when the first touch electrode 116a includes a plurality of ITO lines, each of the plurality of ITO lines may include a plurality of slits 134.

In this case, each of the touch signal lines 124a to 124d may be disposed to overlap the plurality of slits 134 and thin film transistors T. Also, each of the connecting lines 126a and 126b may be disposed to overlap the plurality of slits 134 and thin film transistors T.

Additionally, the connecting lines 126a and 126b and the touch signal lines 124a to 124d are formed on a different metal layer than the touch electrodes 116a and 116b.

Although not shown in FIG. 8, the display panel also includes data lines oriented in the same direction as the touch signal lines 120 and connecting lines 126, and also overlapping with the touch signal lines 120 and connecting lines 126. Referring to FIG. 9, data lines DL are located on the gate insulation layer 102 in a lower metal layer. A first passivation layer 103 is located over the data lines DL.

Touch signaling lines 124 and connecting lines 126 are located in an intermediate metal layer formed on the passivation layer 103. Touch signaling line 124a is located over and overlaps with one of the data lines DL1. The connecting line 126b is located over and overlaps with another data line DL2. Touch signaling line 124b is located over and overlaps with a further data line DL3.

An insulation layer 105 is located over the connecting lines 126 and touch signaling lines 124. The ITO lines of the touch electrode 116b are located over the insulation layer 105. The ITO lines are located on a different metal layer than the connecting lines 126 and touch signaling lines 124. Connecting line 126b is connected to the ITO line via a contact CNT2. Touch signaling line 124b is connected to the ITO line via a contact CNT1. Contacts CNT1 and CNT2 are located in respective contact holes CH in the insulation layer 105.

As described above, according to the embodiments of the present invention, the touch sensitive apparatus reduces a load of a touch electrode, thereby enhancing image quality.

Moreover, according to the embodiments of the present invention, the touch sensitive apparatus reduces a load deviation of a touch electrode, thereby enhancing image quality.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch sensitive display apparatus comprising:
a touch sensitive display panel comprising:
  a plurality of touch electrodes comprising at least a first touch electrode comprised of a first material;
  a first conductive line connected to the first touch electrode at a first plurality of locations, the first touch electrode driven with a common voltage for image display via the first conductive line and driven with a touch driving signal for touch sensing via the first conductive line; and
  a second conductive line different from the first conductive line, the second conductive line connected to the first touch electrode at a second plurality of locations and the second conductive line is comprised of a second material having lower resistance than the first material.

2. The touch sensitive display apparatus of claim 1, the display panel further comprising:
a data line to carry a data voltage to at least one pixel, wherein the data line is in a different layer than the second conductive line, is oriented in a same direction as the second conductive line and overlaps with the second conductive line.

3. The touch sensitive display apparatus of claim 1, wherein the first conductive line and the second conductive line are of a same material and located in a same layer.

4. The touch sensitive display apparatus of claim 1, wherein first touch electrode is comprised of indium tin oxide (ITO), and the second conductive line is comprised of metal having resistivity which is lower than that of ITO.

5. The touch sensitive display apparatus of claim 1, wherein the display panel further comprises:
a second touch electrode of the plurality of touch electrodes;
a third conductive line connected to the second touch electrode at a third plurality of locations, the second touch electrode driven for image display and touch sensing via the third conductive line; and
a fourth conductive line connected to the second touch electrode at a fourth plurality of locations.

6. The touch sensitive display apparatus of claim 1, further comprising:
a driver circuit to drive the display panel in a display period and a touch period, the driver circuit supplying a common voltage for image display to the first touch electrode via the first conductive line during the display period, and supplying a touch driving signal to the first touch electrode via the first conductive line during the touch period.

7. The touch sensitive display apparatus of claim 1, wherein the second conductive line is connected to the first touch electrode via a plurality of contacts at the second plurality of locations.

8. The touch sensitive display apparatus of claim 7, wherein the plurality of contacts are in contact holes in an insulation layer between the second conductive line and the first touch electrode.

9. The touch sensitive display apparatus of claim 1, wherein the first touch electrode comprises a plurality of touch electrode lines that are parallel to each other, wherein the first conductive line is connected to the touch electrode lines at the plurality of first locations, and wherein the second conductive line is connected to the touch electrode lines at the plurality of second locations.

10. The touch sensitive display apparatus of claim 9, wherein the plurality of touch electrode lines are perpendicular to the first conductive line and the second conductive line.

11. The touch sensitive display apparatus of claim 1, wherein the first conductive line is parallel to the second conductive line.

12. The touch sensitive display apparatus of claim 1, wherein the first conductive line is a touch signal line and the second conductive line is a connecting line.

13. The touch sensitive display apparatus of claim 1, wherein the second conductive line is in a different layer than the first touch electrode.

14. A touch sensitive display apparatus comprising:
a touch sensitive display panel comprising:
   a plurality of touch electrodes comprising at least a first touch electrode and the first touch electrode comprises a slit;
   a first conductive line connected to the first touch electrode at a first plurality of locations, the first touch electrode driven with a common voltage for image display via the first conductive line and driven with a touch driving signal for touch sensing via the first conductive line; and
   a second conductive line different from the first conductive line, the second conductive line connected to the first touch electrode at a second plurality of locations, the second conductive line overlapping with the slit.

15. A touch sensitive display apparatus comprising:
a touch sensitive display panel comprising:
   a pixel having a thin film transistor;
   a plurality of touch electrodes comprising at least a first touch electrode;
   a first conductive line connected to the first touch electrode at a first plurality of locations, the first touch electrode driven with a common voltage for image display via the first conductive line and driven with a touch driving signal for touch sensing via the first conductive line; and
   a second conductive line different from the first conductive line, the second conductive line connected to the first touch electrode at a second plurality of locations, the second conductive line overlapping with the thin film transistor.

* * * * *